US008337311B2

(12) United States Patent
Amos et al.

(10) Patent No.: US 8,337,311 B2
(45) Date of Patent: Dec. 25, 2012

(54) LINKED GAMING MACHINES WITH SHARED BONUS GAME

(75) Inventors: William George Amos, Moncton (CA); Sean Michael Miller, Moncton (CA)

(73) Assignee: Spielo International Canada ULC, Moncton, New Brunswick (CA)

( * ) Notice: Subject to any disclaimer, the term of this patent is extended or adjusted under 35 U.S.C. 154(b) by 782 days.

(21) Appl. No.: 12/271,751

(22) Filed: Nov. 14, 2008

(65) Prior Publication Data

US 2010/0124988 A1 May 20, 2010

(51) Int. Cl.
*A63F 13/12* (2006.01)

(52) U.S. Cl. ................ 463/42; 463/19; 463/20; 463/26; 463/27

(58) Field of Classification Search .................... 463/19, 463/20, 26, 27, 42
See application file for complete search history.

(56) References Cited

U.S. PATENT DOCUMENTS 7,314,408 B2 * 1/2008 Cannon .......................... 463/16
2005/0003886 A1 * 1/2005 Englman et al. ................ 463/25
2006/0073887 A1 * 4/2006 Nguyen et al. .................. 463/27
2006/0252546 A1 * 11/2006 Castellari et al. ............... 463/42
2008/0188279 A1 * 8/2008 Seelig et al. .................... 463/19
2009/0124327 A1 * 5/2009 Caputo et al. ................... 463/20
2010/0137052 A1 * 6/2010 Bennett ........................... 463/16

* cited by examiner

*Primary Examiner* — Damon Pierce
(74) *Attorney, Agent, or Firm* — Patent Law Group LLP; Brian D. Ogonowsky

(57) ABSTRACT

A base game may be a conventional video reel-type game. During play of the base game, at least a first progressive jackpot is accumulated by a first percentage of the wagers. A community Bingo game is concurrently initiated for all eligible players (players betting above the minimum bet) when an eligible player achieves a special symbol combination in the base game. The number of virtual Bingo cards dealt to each eligible player is based on the player's average bet. A central controller then random selects Bingo numbers, one at a time, and the first player to fill in a Bingo card wins the bonus game and an award. Only the player that triggered the bonus game is eligible for the first progressive jackpot. At various levels of the game, the players are motivated to bet above the minimum bet to be eligible for the bonus game and increase the player's chances of winning the bonus game.

20 Claims, 4 Drawing Sheets

90

| | | | |
|---|---|---|---|
| **B** | 1 | . . . | 15 |
| **I** | I6 | . . . | 30 |
| **N** | 31 | . . . | 45 |
| **G** | 46 | . . . | 60 |
| **O** | 61 | . . . | 75 |

LINKED GAMING MACHINES WITH SHARED BONUS GAME

FIELD OF THE INVENTION

This invention relates to gaming devices, such as video slot machines, and, in particular, to a bonus game that is simultaneously played by all eligible players of linked gaming machines.

BACKGROUND

Common video slot machines randomly select and display an array of symbols on a video screen, then grant an award to a player based on the occurrence of certain symbol combinations across pay lines. In some games, a player can bet between a minimum bet and a maximum bet on a single game. An increased bet either adds paylines or multiplies the award. Typically, the game ends after the symbols are displayed and the award, if any, is granted. Although these types of games are highly successful, it is advantageous to provide bonus games that infrequently occur to make the game more interesting to a player. A more interesting game will generate increased revenue to the casino by its increased play.

Bonus games are common, where, upon a certain outcome of the main game (or base game), the bonus game is initiated. Typically, each player independently triggers and plays a bonus game.

Linked gaming machines are known where a group of machines communicates with a central server that keeps track of a progressive jackpot, accumulated from a percentage of bets from all the linked machines. If any one player of a linked machine achieves a jackpot-winning outcome, that player wins the progressive jackpot. The same jackpot is won whether the player makes a minimum bet or a maximum bet. In some games, the progressive jackpot may be won only when playing a bonus game.

There is an optimum frequency for triggering bonus game so that a typical player will experience a number of bonus games during a playing session. This maintains player excitement about triggering a bonus game. It is also important not to award a progressive jackpot too frequently, since a high progressive jackpot draws customers to the linked machines.

What is needed is a bonus game that creates more excitement among players when playing linked gaming machines, where the bonus game provides an incentive for the players to bet higher amounts and continue playing. What is also needed is a bonus game that can be frequently triggered while still allowing a high progressive jackpot to be accumulated for maximum player excitement and drawing in customers to play the machines.

SUMMARY

The invention is implemented by a network of linked gaming machines (slot machines), where aspects of games played and awards are controlled by a central bonus game controller such as a server.

A base game played on the gaming machines may be a conventional video reel-type game that displays a randomly selected array of symbols, where combinations of symbols across one or more paylines are evaluated by circuitry to determine an award to be granted. The array may be formed by five reels, where four symbols on each reel are displayed when the reels stop (a 5×4 array). In one embodiment, there are 50 paylines, where a symbol combination must be along a payline (and possibly only left-to-right) for the player to win.

A minimum bet per game is 50 cents (one cent per payline), and a maximum bet per game is $2.50 (5 cents per payline), where the awards are directly multiplied by the amount bet.

During play of the base game, a displayed first tier progressive jackpot is accumulated by a first percentage (e.g., 2-3%) of all the bets on the linked machines, and a lower-value second tier progressive jackpot is accumulated by a second percentage (e.g., 0.5-1%) of the bets. A high progressive jackpot provides incentive for customers to play the linked gaming machines. A seed amount for the first tier progressive jackpot may be $2500, while the seed amount for the second tier jackpot may be $250.

In one embodiment of a bonus game played on the linked gaming devices, a community Bingo game is initiated for only eligible players when an eligible player achieves a special symbol combination in the base game. The player that triggered the Bingo game is designated as a featured player. Eligible players are those who have bet above a certain average bet, higher than the minimum bet, so players are encouraged to bet more than the minimum bet on each game. The eligibility level of a player is displayed on that player's display screen to encourage players to bet sufficient amounts to remain eligible.

Once the community Bingo game is initiated, each eligible player is dealt one or more virtual Bingo cards, where the number of Bingo cards dealt (e.g., 1-4 per player) is based on the player's average bet, so the players are encouraged to bet the maximum bet per game. No two Bingo cards should be the same. The Bingo cards may be conventional, with a 5×5 grid of numbers. There are 75 possible Bingo numbers. The bonus game may be displayed on the same screen that displayed the base game. A central controller controls the bonus game. The controller may be a separate server or a designated one of the linked machines.

The controller then random selects Bingo numbers, one at a time, and the players' cards are automatically filled in by the respective machines. Prior to the selection of the Bingo numbers, three numbers are randomly designated as special numbers.

The first player to fill in a Bingo card wins the bonus game and wins an award. The awards include: 1) awarding the first tier progressive jackpot to the winning player only if that player was the featured player that triggered the Bingo game and the player's filled card contained the three special numbers; 2) awarding the second tier progressive jackpot to the winning player if that player was not the featured player and the player's filled card contained the three special numbers; and 3) awarding 40 times the player's average bet amount to the winning player. The lowest, and most likely, award is based on the average bet, providing further incentive for the players to bet higher than the minimum bet. Additionally, all players win 1× the player's average bet for each filled vertical, horizontal, and diagonal line on the non-filled card.

Assuming there are 10-20 linked gaming machines in a bank of machines, the odds of a player triggering the Bingo game and winning it using the three special numbers are small, so the first tier progressive jackpot can be very high to draw in players. The community Bingo game may be triggered relatively frequently since all eligible players participate when only a single player triggers the Bingo game. Since the Bingo game experience is shared by all eligible players, and a player will always win, there is an increased level of excitement compared to when only a single player plays a conventional bonus game.

As a result of the community bonus game, machine revenue is increased, since players have a great incentive to bet higher than the minimum bet and will play the games for a longer time.

Instead of a Bingo game, a different type of community bonus game can be played.

Instead of the bonus game being triggered by a special combination of symbols in the base game, the bonus game can be triggered by a mystery type trigger. The mystery trigger may be a random jackpot threshold amount, a random selection of an eligible player, a random number of games since the last bonus game, or other trigger. The eligible player that caused the mystery trigger would be the featured player for purposes of being eligible to win the larger award in the bonus game.

In another embodiment, the advantage given to the featured player for triggering the bonus game is that the featured player has an increased chance of winning the bonus game.

In another embodiment, the advantage given to the featured player for triggering the bonus game is that the featured player receives a larger consolation prize than the other players, such as 5× the featured player's average bet for each filled vertical, horizontal, and diagonal line on the non-filled card. Or, the featured player may receive, upon winning the Bingo bonus game without the three special numbers, 100 times the featured player's average bet.

DETAILED DESCRIPTION

Although the invention can typically be implemented by installing a software program in most types of modern networked video gaming machines, one particular gaming machine platform will be described in detail.

Figure 1:
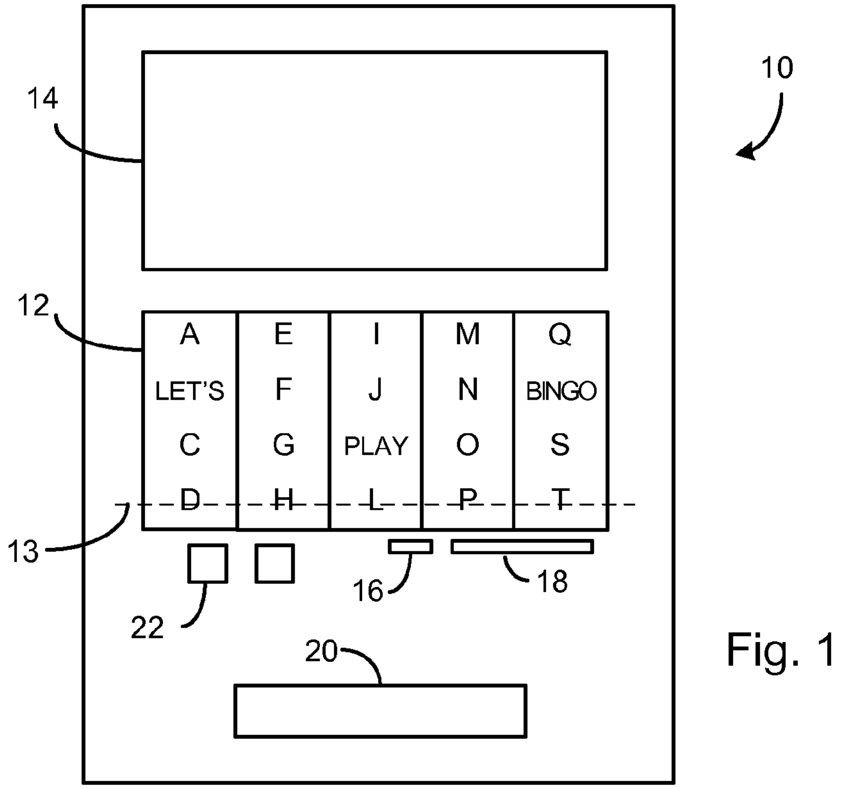
FIG. 1 illustrates a linked gaming machine that displays a base game and a community bonus game in accordance with one embodiment of the present invention.

FIG. 1 illustrates a video gaming machine 10 that incorporates the present invention. The machine 10 includes a bottom display 12 that may be a thin film transistor (TFT) display, a liquid crystal display (LCD), a cathode ray tube (CRT), or any other type of display. In the example shown, the base game in display 12 is the conventional random selection of a 5×4 array of symbols, where an award is granted based on the combination of symbols across a payline, such as payline 13. In one embodiment, there are 50 paylines activated with a single bet, including horizontal and zig-zag paylines. The base game can be any game, such as a 5×3 array of symbols or any other size or shape array, a video card game, or other game.

A top display 14 is also a video screen, which may be identical to the display 12, that may be used to display aspects of the bonus game, described below.

A coin slot 16 accepts coins or tokens in one or more denominations to generate credits within the machine 10 for playing games. An input slot 18 accepts various denominations of banknotes or machine-readable tickets, and may output printed tickets for use in cashless gaming. A coin tray 20 receives coins or tokens from a hopper upon a win or upon the player cashing out. Player control buttons 22 include any buttons needed for the play of the particular game or games offered by machine 10 including, for example, a bet button, a max-bet button, a spin reels button, a cash-out button, and any other suitable button. Pressing the bet button multiple times multiplies the bet. Each bet deducts credits from a credit meter. Buttons 22 may be replaced by a touch screen with virtual buttons.

Figure 2:
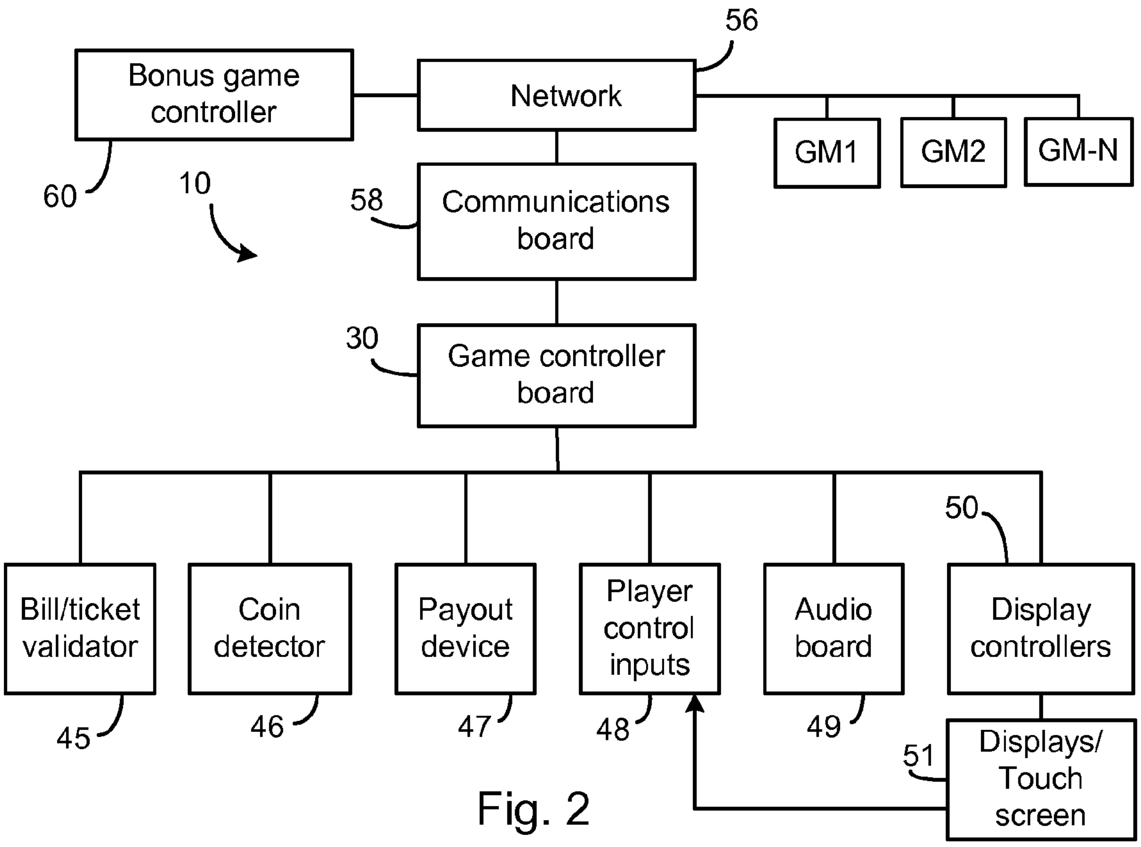
FIG. 2 is a block diagram of key components in the gaming machine of FIG. 1 and illustrates a network connected to linked gaming machines.

FIG. 2 illustrates basic circuit blocks in the machine 10 of FIG. 1 and portions of a network. A game controller board 30 includes a processor (CPU) that runs the gaming program (including aspects of the bonus game) stored in a program ROM, such as a CD. The program ROM may include a pseudo-random number generator program for selecting symbols and for making any other random selections. At least the active portion of the program is stored in a RAM on the board 30 for access by the processor. A pay table ROM on the board 30 detects the outcome of at least the base game and identifies awards to be paid to the player. A bill/ticket validator 45 and coin detector 46 add credits for playing games. A payout device 47 pays out an award to the player in the form of coins or a printed ticket at the end of a game or upon the player cashing out. Player control inputs 48 receive push-button or touch screen inputs for making player selections. An audio board 49 sends signals to the speakers. A display controller 50 receives commands from the processor or network and generates signals for the various displays 51.

The game controller board 30 transmits and receives signals to and from a network 56 via a communications board 58. The network 56 includes servers, including a bonus game controller 60, and other devices that monitor the linked gaming machines 10 and GM1-GM-N and provide communications between the machines 10 and GM1-GM-N. The network 56, controller 60, and internal processors on board 30 process the bonus game so that the same game appears on the displays of the eligible linked gaming machines, enabling all players to interact in the same game. In one embodiment, the controller 60 determines when each player is allowed to participate in the bonus game and completely controls the bonus game.

In the below scenario, a software program for playing the base game and bonus game is installed in the linked gaming machines 10 and GM1-GM-N, and in the bonus game controller 60.

The below description of the game refers to steps in the flowchart of FIG. 8 and to certain screen displays shown in FIGS. 3-7.

Figure 8:
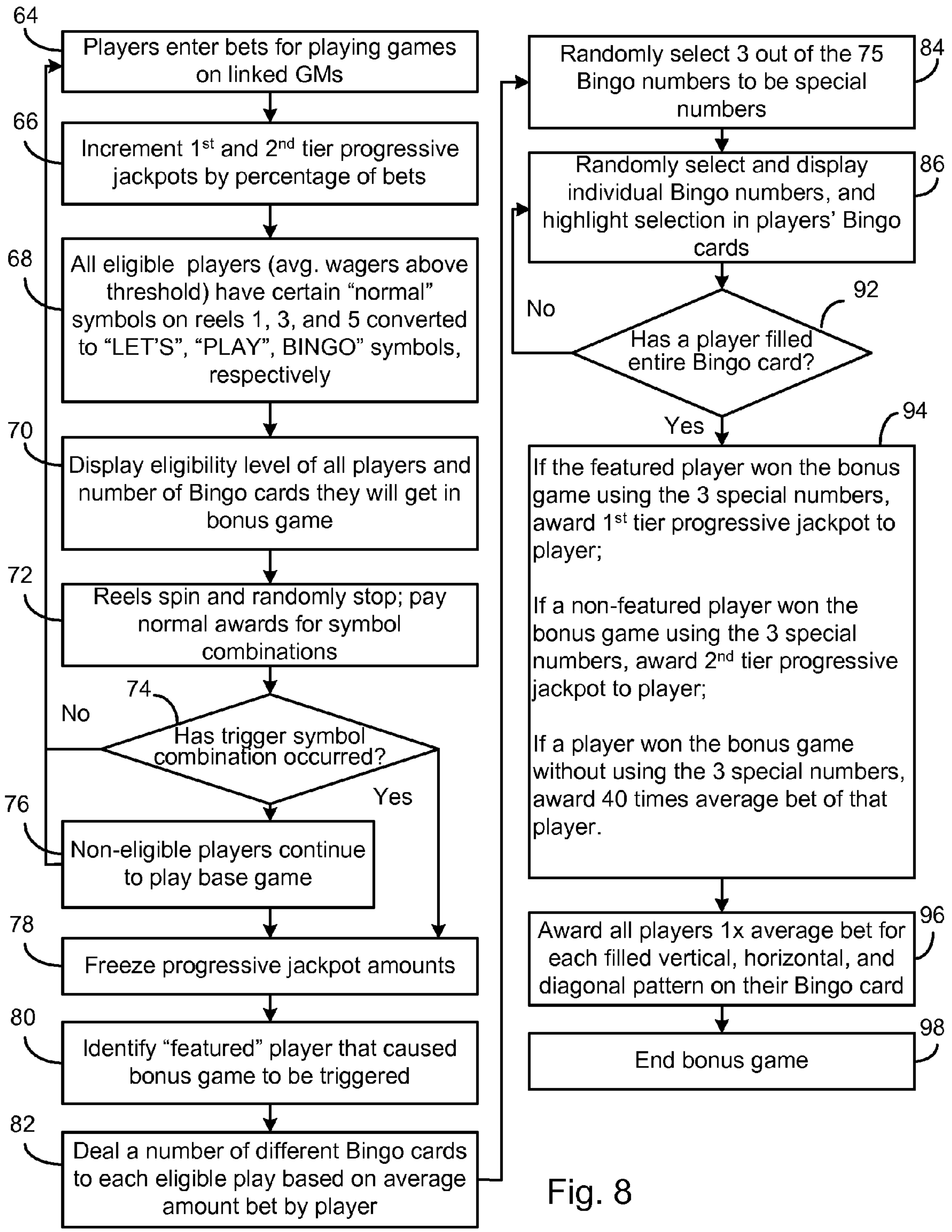
FIG. 8 is a flowchart identifying various steps taken in the carrying out of the bonus game on linked gaming machines, in accordance with one embodiment of the invention.

In step 64 of FIG. 8, each player of a linked gaming machine 10 enters a bet amount for playing the base game on the machine 10. In the example, the base game uses five video reels, where a stopped position of each reel displays four vertically aligned symbols. FIG. 1 shows a sample stopped display of the symbols in a 5×4 array. The game uses 50 paylines across the array, where the paylines include horizontal paylines, such as payline 13, and zig-zag paylines. A player may make a minimum bet of 50 cents (1 cent per payline) so that any winning symbol combination on any one of the paylines will pay a base award. In increments of 50 cents, the player can bet more on a single base game and receive a proportional multiple of the base award. The maximum bet is $2.50 (5 cents per payline) so that winning symbol combinations pay five times the base award.

Figure 3:
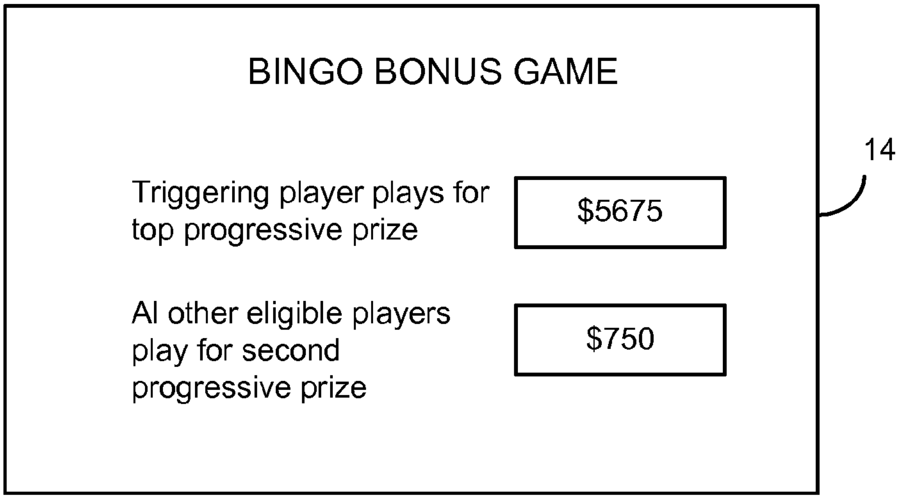
FIG. 3 illustrates a portion of a video screen displaying information about the progressive jackpot amounts in the community Bingo bonus game.

In step 66 of FIG. 8, a percentage of the bets made on all the machines is allocated to a displayed first tier progressive jackpot and a displayed second tier progressive jackpot. In one embodiment, the percentage allocated to the first tier progressive jackpot is between 2-3% of the bets, and the percentage allocated to the second tier progressive jackpot is between 0.5-1% of the bets. The amount in the second tier progressive jackpot will typically be much lower than the amount in the first tier progressive jackpot. The high amount in the first tier progressive jackpot will draw players to the linked machines. The top display 14 of each machine or an overhead display may display the jackpots, as shown in FIG. 3.

The first tier progressive jackpot is seeded, after a win, with a start amount of $2500, and the second tier progressive jackpot is seeded, after a win, with a start amount of $250.

The bonus game controller 60 (FIG. 2) calculates an average bet for each player using the last 100 bets. If the average wager is at least 76 cents (higher than the minimum bet), the player is eligible for participation in the community Bingo bonus game.

As shown in step 68, if a player's average bet is below 76 cents, that player's gaming machine controls its reels to not contain any special symbols used for triggering the Bingo bonus game. In one embodiment, in non-eligible gaming machines, instead of the reels containing the special triggering symbols at certain reel positions, the reels contain a certain scatter symbol or other conventional symbol. For all players whose average bet is at least 76 cents, the reel 1 contains a special symbol "LET'S"; the reel 3 contains the special symbol "PLAY"; and the reel 5 contains the special symbol "BINGO." Such special symbols are shown in the example of a final display in FIG. 1. Since all players know that an average bet above the minimum bet makes the player eligible for the Bingo bonus game, the players are motivated to bet higher than the minimum bet.

Figure 4:
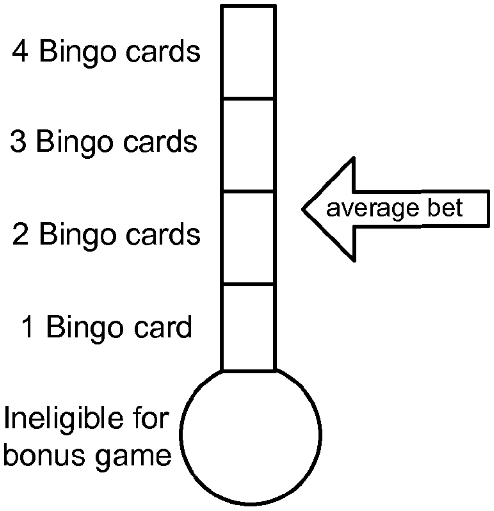
FIG. 4 illustrates a portion of a video screen displaying the player's average bet relative to the benefits of betting even more per game.

As shown in FIG. 4 and step 70, each player has displayed on the top display 14 an indication of where that player's average bet corresponds to eligibility and to how many Bingo cards the player will get when the Bingo bonus game is initiated. This motivates all players to bet the maximum bet to receive the maximum number of Bingo cards. For an average bet of $0.76-$1.25, one card is awarded; for an average bet of $1.26-$1.75, two cards are awarded; for an average bet of $1.76-$2.25, three cards are awarded; and for an average bet of $2.26-$2.50, four cards are awarded.

In step 72, after placing bets, each player of a linked gaming machine 10 plays the base game in the normal manner by pressing a "spin reel" button to begin spinning the five video reels shown in the display 12. The five reels then randomly stop to display the 5×4 array of symbols. Awards for winning combinations of symbols across the paylines are then paid in the normal manner by incrementing a credit meter. The term "random" as used herein includes pseudo-random.

Only the eligible players have reels containing the LET'S, PLAY, and BINGO symbols. If any player's reels display the combination of LET'S PLAY BINGO on the screen, the Bingo bonus game is initiated for all the eligible players (step 74). Accordingly, the frequency of a Bingo game for any eligible player is relatively high, since only one player needs to achieve the trigger combination. The start of the Bingo bonus game is accompanied by fanfare such as lights and sound to generate excitement and attract the attention of non-players.

The non-eligible players continue to play the base game (step 76).

In step 78, upon the start of the Bingo bonus game, the progressive jackpots are frozen so that the continued wagering by the non-eligible players does not increase the displayed jackpots. After the bonus game is over, the bet percentages accumulated during the bonus game are put into the jackpots.

In step 80, the player that triggered the Bingo bonus game by obtaining the LET'S PLAY BINGO combination is identified as the featured player by, for example, a bezel around the display 12 illuminating and/or all players being informed of the location of the featured player on their display 12 or 14. The featured player feels special since she is responsible for the bonus game occurring. As discussed later, being a featured player qualifies the featured player to win the first tier progressive jackpot.

Figure 5:
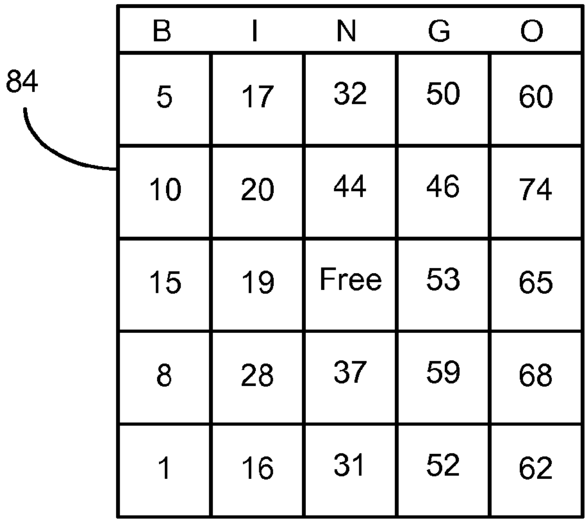
FIG. 5 illustrates a typical Bingo card displayed to a player during the Bingo game.

In step 82, the bonus game controller 60 (FIG. 2) controls each gaming machine to display a number of different Bingo cards 84 (FIG. 5) to each player based on the player's average bet. The correlation between the average bet and the number of cards 84 dealt is shown to the player by the display of FIG. 4. A sample Bingo card 84 is shown in FIG. 5, which is a 5×5 grid of numbers. The B column can only contain numbers from 1-15; the I column can only contain numbers from 16-30; the N column can only contain numbers from 31-45; the G column can only contain numbers from 46-60; and the 0 column can only contain numbers from 61-75. The middle spot is free. Accordingly, there are 75 possible Bingo numbers to randomly select from to fill in the Bingo cards. No two cards are the same.

In another embodiment, the Bingo card can contain any size grid in any shape. The term Bingo is not intended to be restricted to the standard rules of Bingo.

In step 84, three of the possible 75 Bingo numbers that can be selected are designated a special numbers.

Figures 6, 7:
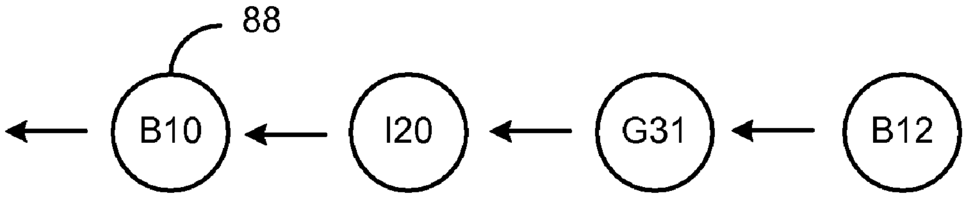
FIG. 6 illustrates Bingo numbers being randomly selected and displayed to the players.
FIG. 7 illustrates the display of Bingo numbers already selected during a game and further identifying special Bingo numbers needed to win a progressive jackpot.

In step 86, all the players playing the Bingo bonus game see the same random selection of Bingo numbers, such as balls with numbers being selected from a pool of numbers. FIG. 6 illustrates four such selected balls 88 being rolled across the display screen. The balls 88 may be selected about a second or two apart, and a voice may announce the selection. As the balls 88 are selected, the gaming machines automatically highlight the corresponding positions in the grid on the Bingo cards 84. The three balls that have been previously designated as special numbers are highlighted, such as being gold. If such balls are selected, the corresponding position on a player's Bingo card will also be specially highlighted in gold.

The accumulated Bingo numbers may be highlighted on a chart 90 in display 14, as shown in FIG. 7. The chart 90 may also identify, using a special gold color, the three special Bingo numbers needed to win a progressive jackpot.

In step 92, the controller 60 determines whether any player's Bingo card is completely filled. If so, that player is the winner, and this may be accompanied with some fanfare using lights and noise to identify the winning player and the amount won.

In step 94, the award to the winning player is determined as follows. If the featured player won the bonus game using the 3 special numbers, the award is the first tier progressive jackpot; if a non-featured player won the bonus game using the 3 special numbers, the award is the second tier progressive jackpot; and if a player won the bonus game without using the 3 special numbers, the award is 40 times the average bet of that player. Since the award rules are advertised beforehand, the players have an additional incentive to make maximum bets on each base game.

In step 96, to further create interest in the bonus game, for all cards not completely filled, all players win 1× their average bet for all completed vertical, horizontal, and diagonal lines filled in at the end of the bonus game.

In step 98, the Bingo bonus game ends, and the gaming machines' displays 12 revert back to showing the reels instead of the Bingo cards.

Although unlikely, two players may fill in their cards at the same time, and they will both win the advertised amount.

By using the a community bonus game triggered by only one eligible player, there is a relative high frequency of occurrence of the bonus game, which maintains a level of excitement in the players and attracts customers to the linked machines. Further, at least one player always wins the bonus game. However, it is relatively rare that a featured player will win the bonus game using the three special numbers. Therefore, the first progressive jackpot will usually be high to attract more players and keep players betting at the machines. At various levels of the bonus game, the players are motivated to bet more than the minimum bet, which increases revenue to the casino and increases player excitement.

To avoid players playing the base game very slowly to take advantage of the community bonus game, a 2-minute timer counts down between games. If the player does not play within 2 minutes, the player's average bet is reduced to zero, making the player ineligible to participate in the bonus game. The timer's countdown is displayed to the player when 10 seconds are left. Further, to be eligible, the player must have enough stored credits in the machine to make a minimum bet to signify that the gaming machine is still being played. There is a 10 second grace period for credits less than the minimum bet to be in the machine before a player is deemed ineligible to participate in the bonus game. The timer's countdown is displayed to the player.

In another embodiment, the community bonus game may be a non-Bingo type game. One type of community bonus game may be that all eligible players get free spins for two minutes, and the player with the highest accumulated total of tournament credits at the end of the bonus round wins the bonus prize. The featured player may win the first tier progressive jackpot or a certain multiple of the bonus prize. The tournament credits themselves cannot be cashed in.

Instead of the bonus game being triggered by a special combination of symbols in the base game, the bonus game can be triggered by a mystery type trigger. One suitable type of trigger is when the first tier progressive jackpot reaches a pseudo-randomly selected level. The eligible player that made the bet that caused the threshold to be exceeded would be the featured player for purposes of being eligible to win the big award in the bonus game. The mystery trigger may also be a certain number of games played since the last bonus game, and the eligible player whose game caused the threshold to be exceeded would be the featured player. The mystery trigger may also be a random selection of one of the eligible players, or other type of mystery trigger. The bonus game controller 60 (FIG. 2) selects the thresholds using a random number generator (RNG) having a limited range of numbers, monitors the necessary data from the gaming machines, determines when the threshold has been exceeded, and identifies the featured player. In the embodiment where the player is randomly selected, the controller 60 directly selects the eligible gaming machine using the RNG, and may weight the odds in favor of players that have higher bet averages, so that players are provided with additional incentive to place higher bets.

In another embodiment, the advantage given to the featured player for triggering the bonus game is that the featured player has an increased chance of winning the bonus game. This may be implemented by the controller 60 dealing the featured player extra Bingo cards, such as 2 or 4 extra cards.

In another embodiment, the advantage given to the featured player for triggering the bonus game is that the featured player receives a higher consolation prize than the other players, such as 5× the featured player's average bet for each filled vertical, horizontal, and diagonal line on the non-filled card. Or, the feature player may receive, upon winning the Bingo bonus game without the three special numbers, 100 times the featured player's average bet. This determination is all carried out by suitably programming the controller 60.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a network of linked gaming devices, a plurality of players playing games on the linked gaming devices, the method comprising:

the players entering bets into the gaming machines to play a base game on the gaming machines;

achieving a trigger condition at one of the gaming machines played by the players for triggering a competitive community bonus game, wherein all players competing in the bonus game compete against each other to win the bonus game by only one of the players, the player at the gaming machine that achieved the trigger condition being a featured player, the featured player receiving a special benefit during the bonus game not available to non-featured players during playing of the bonus game;

concurrently initiating the community bonus game for the players, including the featured player and the non-featured players, wherein all the players play the same bonus game until one player wins the bonus game, wherein the special benefit comprises only the featured player is eligible to win a highest available award;

determining a winning player of the bonus game; and granting the winning player an award.

2. The method of claim 1 wherein the trigger condition is a particular symbol combination obtained during the base game.

3. The method of claim 1 wherein the trigger condition is a progressive jackpot threshold amount being exceeded by a bet.

4. The method of claim 1 wherein the trigger condition is a particular eligible player being pseudo-randomly selected.

5. The method of claim 1 wherein the trigger condition is a particular number of base games played since a previous community bonus game.

6. The method of claim 1 wherein the special benefit to the featured player further comprises the featured player is given an improved chance of winning the bonus game.

7. The method of claim 1 further comprising accumulating at least a first progressive jackpot from a percentage of the bets entered into the gaming machines from all players playing the gaming machines; and wherein the special benefit to the featured player is that only the featured player is eligible to win the first progressive jackpot.

8. The method of claim 1 wherein the base game comprises rotation of virtual reels having reel strips with symbols, where the reels pseudo-randomly stop to display an array of symbols across a display screen.

9. The method of claim 8 wherein the trigger condition is a particular symbol combination obtained during the base game, the method further comprising changing certain symbols on the reel strips when a player becomes eligible to participate in the bonus game so that only eligible players may achieve the particular symbol combination, wherein prior to changing the certain symbols ineligible players could not achieve the particular symbol combination.

10. The method of claim 1 further comprising determining eligible players for playing the bonus game based on an average level of a player's bet, there being a plurality of eligible players.

11. The method of claim 10 wherein a higher average bet increases a player's chances of winning the bonus game.

12. The method of claim 10 wherein an increasing level of a player's bet above the minimum bet increases a player's chances of winning the bonus game.

13. The method of claim 1 wherein the community bonus game is a Bingo game comprising:

providing to each player a number of different Bingo cards, wherein the number of cards provided to a player corresponds to an average bet by the player, each card having a grid of different arrangements of symbols;

pseudo-randomly selecting symbols for filling in the grid; and determining a winning player by a first player to have a card with a filled-in grid.

14. The method of claim 13 wherein at least some of the symbols pseudo-randomly selected for filling in the grid are deemed special symbols, a winning player using the special symbols when filling in the grid being awarded an enhanced prize.

15. The method of claim 1 wherein the base game comprises rotation of virtual reels having reel strips with symbols, where the reels pseudo-randomly stop to display an array of symbols across a display screen, wherein the trigger condition is a particular symbol combination obtained during the base game;

the method further comprising changing certain symbols on the reel strips when a player becomes eligible to participate in the bonus game so that only eligible players may achieve the particular symbol combination, wherein prior to changing the certain symbols ineligible players could not achieve the particular symbol combination;

wherein eligible players are determined based on an average level of a player's bet;

wherein the community bonus game is a Bingo game comprising:

providing to each eligible player a number of different Bingo cards, wherein the number of cards provided to a player corresponds to an average bet by the player, each card having a grid of different arrangements of symbols;

pseudo-randomly selecting symbols for filling in the grid;

determining a winning player by a first player to have a card with a filled-in grid, wherein at least some of the symbols pseudo-randomly selected for filling in the grid are deemed special symbols, a winning player using the special symbols when filling in the grid being awarded an enhanced prize.

16. The network of claim 1 wherein the linked gaming devices comprise slot machines.

17. A network of linked gaming devices, the network including a bonus game controller, the network comprising at least one programmed processor for carrying out the method comprising:

detecting bets entered into the gaming machines by players to play a base game on the gaming machines, the bets including a minimum bet and a maximum bet, wherein the base game comprises rotation of virtual reels having reel strips with symbols, where the reels pseudo-randomly stop to display an array of symbols across a display screen;

determining eligible players based on an average level of a player's bet above the minimum bet, there being a plurality of eligible players;

changing certain symbols on the reel strips when a player becomes eligible to participate in a competitive community bonus game so that only eligible players may achieve a particular symbol combination, wherein prior to changing the certain symbols ineligible players could not achieve the particular symbol combination, the competitive community bonus game being one where all players competing in the bonus game compete against each other to win the bonus game by only one of the players;

achieving the particular symbol combination, as a trigger condition, at one of the gaming machines played by one of the eligible players for triggering the community bonus game, the player at the gaming machine that achieved the trigger condition being a featured player, the featured player receiving a special benefit during the bonus game not available to non-featured players during playing of the bonus game;

concurrently initiating the community bonus game only for all the eligible players, including the featured player and the non-featured players, wherein all the eligible players play the same bonus game until one player wins the bonus game, wherein an increasing level of a player's bet above the minimum bet increases a player's chances of winning the bonus game, wherein the special benefit comprises only the featured player is eligible to win a highest available award;

determining a winning player of the bonus game; and granting the winning player an award.

18. The network of claim 17 wherein the community bonus game is a Bingo game comprising:

providing to each eligible player a number of different Bingo cards, wherein the number of cards provided to a player corresponds to an average bet by the player, each card having a grid of different arrangements of symbols;

pseudo-randomly selecting symbols for filling in the grid; and determining a winning player by a first player to have a card with a filled-in grid, wherein at least some of the symbols pseudo-randomly selected for filling in the grid are deemed special symbols, a winning player using the special symbols when filling in the grid being awarded an enhanced prize.

19. The network of claim 17 further comprising accumulating at least a first progressive jackpot from a percentage of the bets entered into the gaming machines from all players playing the gaming machines; and wherein the special benefit to the featured player is that only the featured player is eligible to win the first progressive jackpot.

20. The network of claim 17 wherein the linked gaming devices comprise slot machines.

* * * * *